March 5, 1940. H. N. DAVIS 2,192,541
UNION BALL CHECK VALVE
Filed March 3, 1939
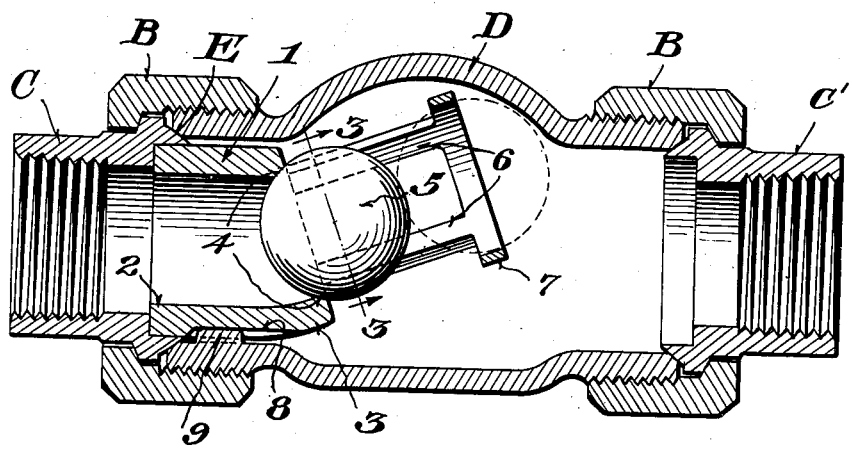
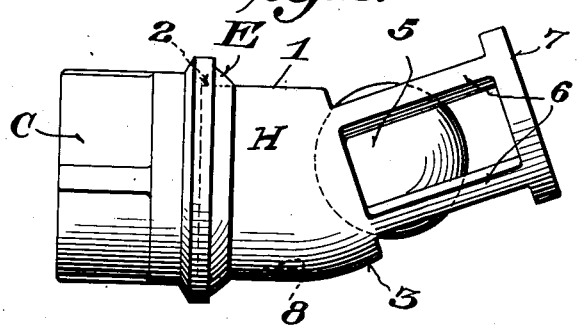
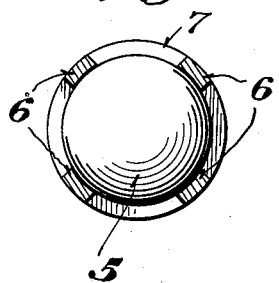
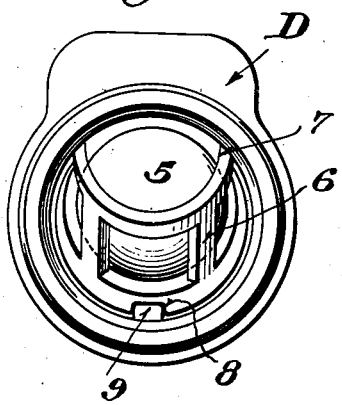
Inventor
Homer N. Davis,
By William... & Groff
Attorneys Patented Mar. 5, 1940

2,192,541

UNITED STATES PATENT OFFICE 2,192,541

UNION BALL CHECK VALVE

Homer N. Davis, Catawissa, Pa.

Application March 3, 1939, Serial No. 259,651

2 Claims. (Cl. 251—121)

This invention relates to check valves of the ball type, and more particularly to a construction wherein the ball is so mounted and guided as to give maximum clearance to the passage of fluid when the ball is unseated.

To that end the invention has as its principal object the provision of a novel ball holder or cage of skeleton formation which guides or deflects the valve as it becomes unseated, and, on the other hand, returns the valve to seated position in a quick and positive manner either by gravity or unbalanced pressure occurring in the line.

A special object of the invention is to make a ball holding unit which is readily insertable in and removable from a casing forming part of a valve union particularly adapted for use in high pressure pipe lines. Thus, the ball holder is capable of being made and stocked separately from the union, and when installed offers minimum resistance to fluid flow.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which:

Figure 1 is a vertical sectional view of a combined unit and check valve embodying the present improvements.

Figure 2 is a detail view of the ball and ball holder.

Figure 3 is a cross sectional view taken on the line 3—3 of Figure 1.

Figure 4 is an end view of the union looking toward the up-turned end of the ball holder.

Similar reference characters designate corresponding parts throughout the several figures of the drawing.

According to the embodiment of the invention shown in the drawing, the same includes in its organization a valve casing having its opposite end portions externally threaded to receive the coupling rings B for clamping the nipple sections C and C' thereto. The section C constitutes a part of a novel ball holder H as will presently appear. The medial portion of the casing is upwardly arched as indicated at D to provide an interior chamber or pocket for accommodating the upturned end of the ball holder and the ball so as to enable the ball to move a sufficient distance to provide maximum fluid clearance through the valve seat when the ball is unseated by flow in the normal direction through the casing.

As previously indicated, a distinctive feature of the invention resides in the provision of a novel ball holder H. This holder comprises a body I having an annular portion 2 whose axis is concentric with and which is adapted to be fitted into the section C, under pressure, thereby to make the body of the holder, in effect, an integral part thereof. The advantage of this arrangement is that the coupling ring B will removably clamp the combined member C—H in fluid tight relation to the chamfered seat E defining the inlet port of the casing. The portion of the holder I opposite the end 2 is curved as indicated at 3 to form a section which is oblique to the axis of the casing, and this section is provided at the mouth thereof with a valve seat 4 against which the ball 5 is adapted normally to rest. The portion of the body I inwardly remote from the end 2 is cut away to form a plurality of spaced bars or like portions 6 which serve as a guide for the ball 5, said members 6 terminating in a ring-like collar 7. The purpose of this open walled construction is to provide maximum clearance to permit fluid freely to flow past the valve even though the pressure is only sufficient to unseat the ball 5 to a slight extent. However, when the pressure on the inlet side of the ball 5 is relatively high, the ball will not only be unseated, but will be pushed upwardly until the ball strikes the inner surface of the arched portion D. When the ball reaches the dotted line position shown in Figure 1 it will be apparent that it is sufficiently out of the way of the passage of fluid to offer the least possible resistance to fluid flow.

The body I of the valve is provided at the proper point on its outer face with a notch or recess 8 intended to receive an upstanding boss or key 9 formed on the inner surface of the casing adjacent the chamfered seat E. The purpose of this arrangement is to enable the ball holder containing the ball to be easily and quickly inserted in the proper position in the casing and, thereby insure the upturned end of the holder being properly located in the recess formed by the arched portion D.

From the foregoing it will be apparent that the present invention provides a ball holder which may be readily and easily manufactured and likewise readily installed in a check valve casing in a simple and expeditious manner. When once installed, the ball will tend to gravitate to proper engagement with the valve seat 4, due to the inclination of the cage like portion 6, assuming, of course, that pressures are balanced on both sides of the ball. On the other hand, the ball is sensitive to unbalanced pressures and will readily be unseated as the demand requires, or under high pressures, the ball will be pushed to its upward limit within the cage and thus offer minimum resistance to fluid flow.

In the event that it becomes necessary to renew or repair the valve, this operation may be readily accomplished by simply removing the ball holder C—H and substituting a new one in place thereof. In other words, it will not be necessary to insert an entirely new valve casing as required, for example, in constructions where the ball guide is an integral part of the casing. Moreover, the present construction is superior to valves of the type just referred to inasmuch as the absence of ball guiding means integral with the casing itself reduces resistance to flow and provides a more efficient valve.

Without further description, it is thought that the features and advantages of the invention will be readily apparent to those skilled in the art, and it will, of course, be understood that changes in the form, proportion, and minor details of construction may be resorted to, without departing from the spirit of the invention and scope of the appended claims.

I claim:

1. In a check valve device, a casing having an inlet port, a combined valve seat and ball holder unit having a portion positioned co-axially with said inlet port and also having an opened walled oblique portion, said seat and ball holder being slidable integrally into and out of the casing as a unit, a ball cooperating with said seat and adapted to be moved by fluid pressure away from said seat toward the casing, means for removably clamping the ball holder to the casing, and cooperating means on the casing and ball seat for holding the seat from rotation in the casing.

2. In a check valve device, a casing having an inlet port and also having one wall thereof arched to provide a pocket, a combined valve seat and ball holder unit having a portion positioned co-axially with said inlet port and also having an opened walled oblique portion directed upwardly toward said pocket, said seat and ball holder being slidable integrally into and out of the casing as a unit, a ball cooperating with said seat and adapted to be moved by fluid pressure away from said seat toward the arched wall of the casing, means for removably clamping the ball holder to the casing, and cooperating means on the casing and ball seat for holding the seat from rotation in the casing.

HOMER N. DAVIS.